(12) United States Patent
Charge et al.

(10) Patent No.: US 10,569,630 B2
(45) Date of Patent: Feb. 25, 2020

(54) FLUSH GLAZED DEVICE FOR VEHICLE DOOR, AND CORRESPONDING DOOR, MOTOR VEHICLE, PRODUCTION METHOD AND SEALING DEVICE

(71) Applicants: ADVANCED CONFORT SYSTEMS FRANCE SAS—ACS FRANCE, Bressuire (FR); COOPER STANDARD FRANCE S.A.S, Rennes (FR)

(72) Inventors: Philippe Charge, Bressuire (FR); Patrice Gras, Saint-M'herve (FR)

(*) Notice: Subject to any disclaimer, the term of this patent is extended or adjusted under 35 U.S.C. 154(b) by 17 days.

(21) Appl. No.: 15/738,456

(22) PCT Filed: Sep. 30, 2016

(86) PCT No.: PCT/EP2016/073461
§ 371 (c)(1),
(2) Date: Dec. 20, 2017

(87) PCT Pub. No.: WO2017/055577
PCT Pub. Date: Apr. 6, 2017

(65) Prior Publication Data
US 2018/0186225 A1 Jul. 5, 2018

(30) Foreign Application Priority Data
Oct. 2, 2015 (FR) ...................... 15 59414

(51) Int. Cl.
*B60J 10/79* (2016.01)
*B60J 10/88* (2016.01)

(52) U.S. Cl.
CPC .............. *B60J 10/79* (2016.02); *B60J 10/88* (2016.02)

(58) Field of Classification Search
CPC ................... B60J 10/79; B60J 10/88
See application file for complete search history.

(56) References Cited

U.S. PATENT DOCUMENTS

| 4,240,227 A | 12/1980 | Freudenberg |
| 4,608,779 A | 9/1986 | Maeda et al. |

(Continued)

FOREIGN PATENT DOCUMENTS

| EP | 0512673 A2 | 11/1992 |
| FR | 2872094 A1 | 12/2005 |

*Primary Examiner* — D Glenn Dayoan
*Assistant Examiner* — Melissa Ann Bonifazi
(74) *Attorney, Agent, or Firm* — Benoit & Côté Inc.

(57) ABSTRACT

The invention concerns a glazed device (11) intended to be assembled to a door shell (10) for forming a door (1) of a motor vehicle, comprising at least one movable glazed panel (110) and guide rails (112A, 112B) for guiding said movable glazed panel (110) in a sliding manner between a sealed position and at least one open position, said movable glazed panel (110) carrying, on the face of same facing the inside of the vehicle, at least one guide shoe (116, 117, 118) mounted sliding relative to one of said guide rails (112A, 112B), said guide rails (112A, 112B) being linked at the top part of same by an upper cross-member (111), said upper cross-member (111) carrying first sealing means (115*d*) intended to come into contact with the bodywork of the vehicle when the door (1) is closed, and said upper cross-member (111) and said guide rails (112A, 112B) carry second sealing means (115) intended to come into contact with the movable glazed panel (110). According to the invention, the first sealing means (115*d*) and the second sealing means (115) are produced as a single part.

10 Claims, 4 Drawing Sheets

(56) References Cited

U.S. PATENT DOCUMENTS

2013/0074417 A1    3/2013   Kawai et al.
2013/0292965 A1   11/2013   Prater

FLUSH GLAZED DEVICE FOR VEHICLE DOOR, AND CORRESPONDING DOOR, MOTOR VEHICLE, PRODUCTION METHOD AND SEALING DEVICE

FIELD OF THE INVENTION

The field of the invention is that of motor vehicles.

More specifically, the invention relates to vehicle doors, and in particular the equipment of recesses formed in such doors.

Still more specifically, the invention relates to vehicle doors equipped with at least one glazed panel capable of moving substantially vertically, in particular in order to go from a closed position to an open position in which it integrally or partially penetrates a lower body casing (the mobile panel of course being capable of generally adopting a plurality of intermediate positions).

Such a vehicle door may in particular be a side door, but the invention may also be applied, for example, to swinging and/or sliding doors of a vehicle, including rear doors, hatches, and so on.

PRIOR ART

Examples of such glazed devices are described in particular in patent documents EP 0 778 168 and EP 0 857 844.

According to this approach, a frame is provided, on the side facing the interior of the vehicle, with one or more (conventionally two) rails, cooperating with glides secured to the mobile glazed panel, and attached on the face thereof oriented toward the interior of the vehicle. The frame may, depending on the circumstances, be truncated and limited to jambs with rails.

This technique is beneficial because it makes it possible to conceive original designs, due to the removal of the conventional door frame, while preserving effective guiding and support of the mobile panel.

Patent document FR 2 872 094 discloses a technique making it possible to produce motor vehicle doors on which the glazed surface is flush-mounted (i.e. in which no frame is visible from the outside) and consisting in separately producing a door structure and a glazed assembly, which are assembled by stacking in order to form a vehicle door.

Although this principle is beneficial, the means ensuring the sealing of such a door are not easy to produce (due to their complex shape) and assemble.

Moreover, such a vehicle door also requires the assembly of a large number of parts, which is contrary to the objectives of reducing the weight and bulk of glazed devices.

OBJECTIVES OF THE INVENTION

This invention is intended to resolve the weaknesses of said prior art.

The invention is intended to provide such a vehicle door having a flush-mounted appearance in itself and with vehicle bodies, and which has a good structural quality and seal.

More specifically, the invention is intended to provide a glazed device for producing a vehicle door that is simple to implement and assemble, for example, on an assembly line.

The invention is also intended to provide a method for producing a door for a motor vehicle that can be implemented simply and quickly.

In addition, the invention is intended to provide such a glazed device that can easily be maintained or replaced, for example, after an accident.

DESCRIPTION OF THE INVENTION

These objectives, as well as others which will appear below, are achieved by a glazed device intended to be assembled to a door casing in order to form a motor vehicle door, including at least one mobile glazed panel and guide rails by sliding said mobile glazed panel between a closed position and at least one open position, said mobile glazed panel having, on its face oriented toward the interior of the vehicle, at least one guide glide slidably mounted with respect to one of said guide rails, said guide rails being connected in their upper portion by an upper cross member, said upper cross member having first sealing means intended to come into contact with the vehicle body when the door is closed, and said upper cross member and said guide rails have second distinct sealing means intended to come into contact with the mobile glazed panel.

According to the invention, the first sealing means and the second sealing means are produced in a single piece.

Thus, a glazed device that is intended to be positioned on a door structure is produced simply by providing two sealing levels:

- between the mobile glazed panel and the frame of the glazed device, the latter being formed by guide rails of the mobile glazed panel and a cross member connecting the upper ends of the rails, and
- between the frame of the glazed device and the vehicle body once the glazed device is mounted on the door structure and the door is attached to the vehicle.

It is thus possible to have an effective operation and a sealed closure, for each glazed device and each door, in spite of the tolerances necessary for the production and assembly of vehicles.

According to a particular aspect of the invention, the first sealing means and the second sealing means are welded onto said upper cross member.

According to a particular aspect of the invention, the first sealing means and the second sealing means are overmolded on said upper cross member.

According to a particular aspect of the invention, the second sealing means are in the form of a continuous seal.

According to a particular aspect of the invention, the first sealing means and the second sealing means are secured by clipping on said upper cross member, and on said guide rails for the second sealing means.

According to a particular aspect of the invention, the first sealing means are arranged on the upper face of said upper cross member and the second sealing means are arranged on the lower face of said upper cross member.

According to a particular aspect of the invention, said upper cross member includes a slot in which an edge of the vehicle body casing is intended to be housed.

According to a particular aspect of the invention, said slot is located between the upper face and the lower face of said upper cross member.

According to a particular aspect of the invention, the glazed device includes a lower cross member connecting the two guide rails in their lower portion and intended to be attached on the vehicle body casing.

The invention also relates to motor vehicle doors, including a glazed device according to the features described above, as well as motor vehicles including at least one such glazed device.

The invention also relates to a method for producing a motor vehicle door including the following steps:
- production of a door casing;
- production of a glazed device including at least one mobile glazed panel and guide rails by sliding of said mobile glazed panel between a closed position and at least one open position, said mobile glazed panel having, on its face oriented toward the interior of the vehicle, at least one guide glide slidably mounted with respect to one of said guide rails, said guide rails being connected in their upper portion by an upper cross member,
- assembly of said door casing and said glazed device.

According to the invention, the step of producing the glazed device includes a step of producing in a single piece first sealing means and second sealing means and a step of placing first sealing means on said upper cross member intended to come into contact with the vehicle body when the door is closed, and a step of placing, on said upper cross member and said guide rails, second distinct sealing means intended to come into contact with the mobile glazed panel.

This method for producing a motor vehicle door can be implemented simply and quickly.

The invention also relates to a sealing-tight device for a glazed device according to the features described above, said sealing-tight device comprising:
- first sealing means carried by said upper cross member and intended to come into contact with the vehicle body when the door is closed, and
- second sealing means carried by said upper cross member and said guide rails and intended to come into contact with the mobile glazed panel.

According to the invention, the first sealing means and the second sealing means are produced in a single piece.

SUMMARY OF THE FIGURES

Other features and advantages of the invention will become clearer upon reading the following description of an embodiment of the invention, provided as a simple illustrative and non-limiting example, and the appended drawings, wherein:

FIG. 5 schematically illustrates the steps of an embodiment of the method for producing a motor vehicle door according to the invention.

DETAILED DESCRIPTION OF AN EMBODIMENT

The invention therefore relates to a new technique making it possible to produce a motor vehicle door (side door, rear door, hatch, cabin door, and so on), the glazing, or mobile panel, of which is perfectly aligned and flush with the vehicle body.

Figure 1:
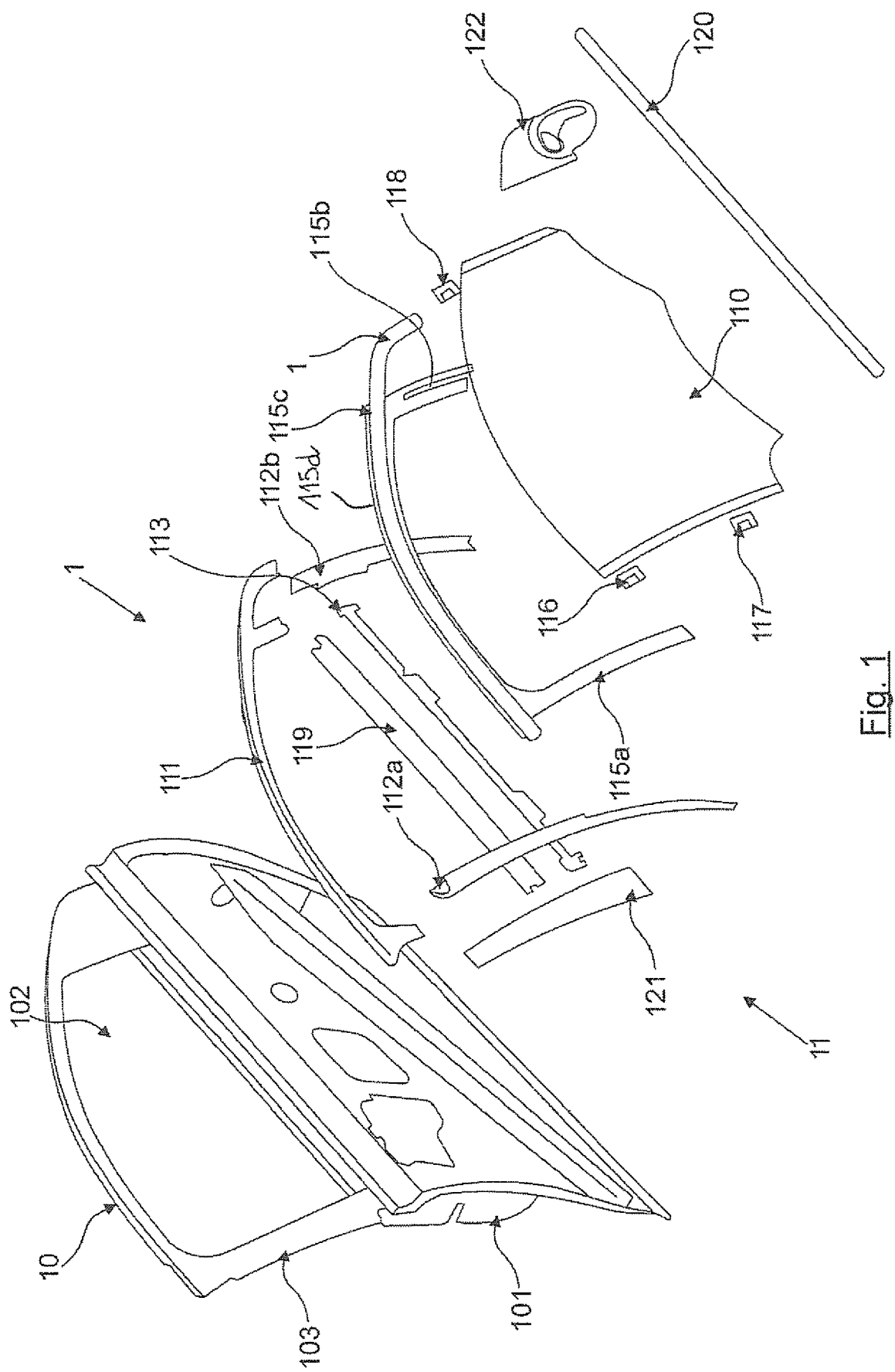
FIG. 1 is an exploded view of the assembly forming the structure of a vehicle door according to the invention.
Figure 2:
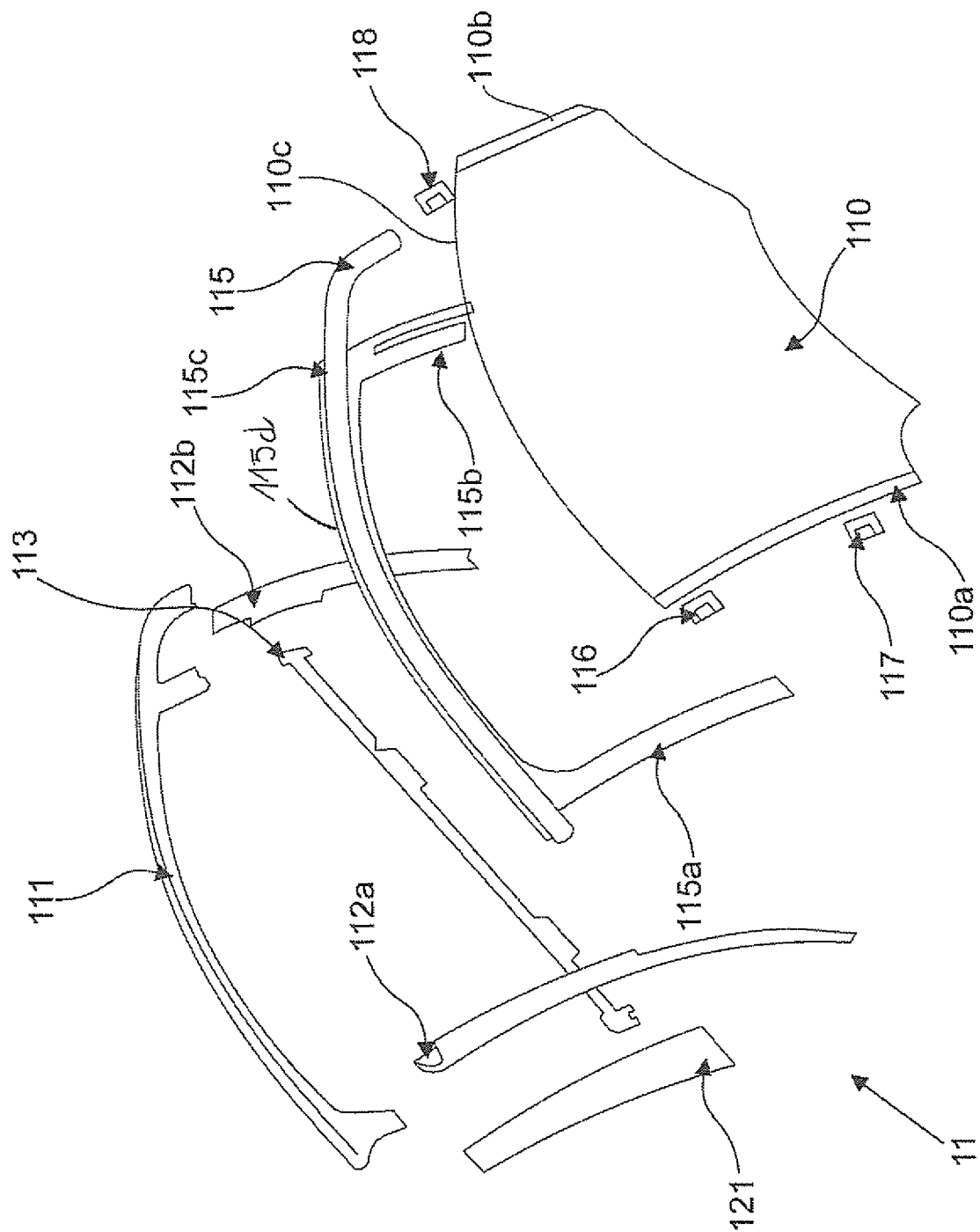
FIG. 2 is an exploded view of the glazed assembly of FIG. 1.

As shown in FIGS. 1 and 2, the embodiment described below relates to a front side door of a vehicle. However, of course, the same approach may be used on other doors of a vehicle.

Said motor vehicle door, and, in particular, the glazed portion thereof, is flush, i.e. no frame or frame element projects toward the outside of the vehicle, with respect to the plane of said glazed portion.

Said door 1 conventionally includes a door casing or chassis 10, forming the structure of said door. The casing 10 includes an upper frame 103, which defines an opening 102, and which is connected to a lower portion 101. In the figures, the exterior element of the vehicle body is omitted, so as to show the interior of the lower portion 101 of the casing 10, which includes in particular elements for receiving and holding the glazed portion 11.

Said glazed portion 11 is produced independently, as shown in FIG. 2, and then assembled to the casing 10, in order to form the door 1.

The glazed portion 11 includes a frame having an upper cross member 111, connecting two jambs each formed by a guide rail $112_A$, $112_B$ by sliding a mobile glazed panel 110 and a central cross member 113.

The mobile glazed panel, or glazing, 110, may be moved in a substantially vertical direction between:
- a closed position, in which it closes the opening 102 formed in the upper frame 103 of the casing 10, its lower periphery $110_D$ remaining inserted in the thickness (i.e. in the lower portion 101) of the casing 10, the upper edge $110_C$ coming into contact with the glazing seal, which will be described below, the front $110_B$ and rear $110_A$ edges being located in the rails $112_A$, $112_B$;
- an open position, in which it frees the opening 102 and is completely or partially retracted in the thickness of the casing 10, and
- intermediate positions.

It is noted that the rails $112_A$, $112_B$ constitute structural elements of the glazed portion 11.

The upper cross member 111 has a curvature corresponding to that of the upper frame 103 of the casing 10. The upper cross member 111 is made of plastic, in this example. The two rails $112_A$, $112_B$, which are made of plastic or aluminum are mounted by screwing or riveting on the upper cross member 111.

The glazed portion 11 is assembled independently of the door casing 10, then mounted on the latter by attachment of the upper cross member 111 and the rails $112_A$, $112_B$ on the casing 10.

Thus, a door 1 capable of being mounted directly on the vehicle is obtained.

To ensure the seal between the chassis 10 of the door 1 and the mobile glazed panel 110 when the latter is in the closed position (so as to prevent water or other elements from entering the vehicle), the upper cross member 111 and the rails $112_A$, $112_B$ have a peripheral glazing seal 115 (called slide) which comes into contact with the contour of the mobile glazed panel 110. Said glazing seal 115 is in the form of a continuous strip and includes an upper portion $115_C$, the curvature of which corresponds to that of the upper cross member 111 and the upper frame 103 of the casing 10. The glazing seal 115 also includes two rectilinear branches $115_A$, $115_B$ extending parallel from said upper portion $115_C$.

One or more door sealing lips 115d are arranged above (i.e. on the upper surface $111_B$) of the upper cross member 111 so as to be compressed between the upper cross member 111 and the vehicle body (referenced "C" in FIG. 3) when the door 1 is closed, ensuring a good seal.

The sealing lip(s) 115d and the glazing seal 115 are produced in a single piece.

As shown in the cross-section views of FIGS. 3 and 4, the glazing seal 115 is attached on the bottom (i.e. on the lower surface 111$_C$) of the upper cross member 111 and on the rails 112$_A$, 112$_B$, so as to be concealed below the mobile glazed panel 110 when it is closed.

The glazing seal 115 is then compressed between the upper frame 103 of the casing 10 and the mobile glazed panel 110, which ensures a good seal.

Figure 3:
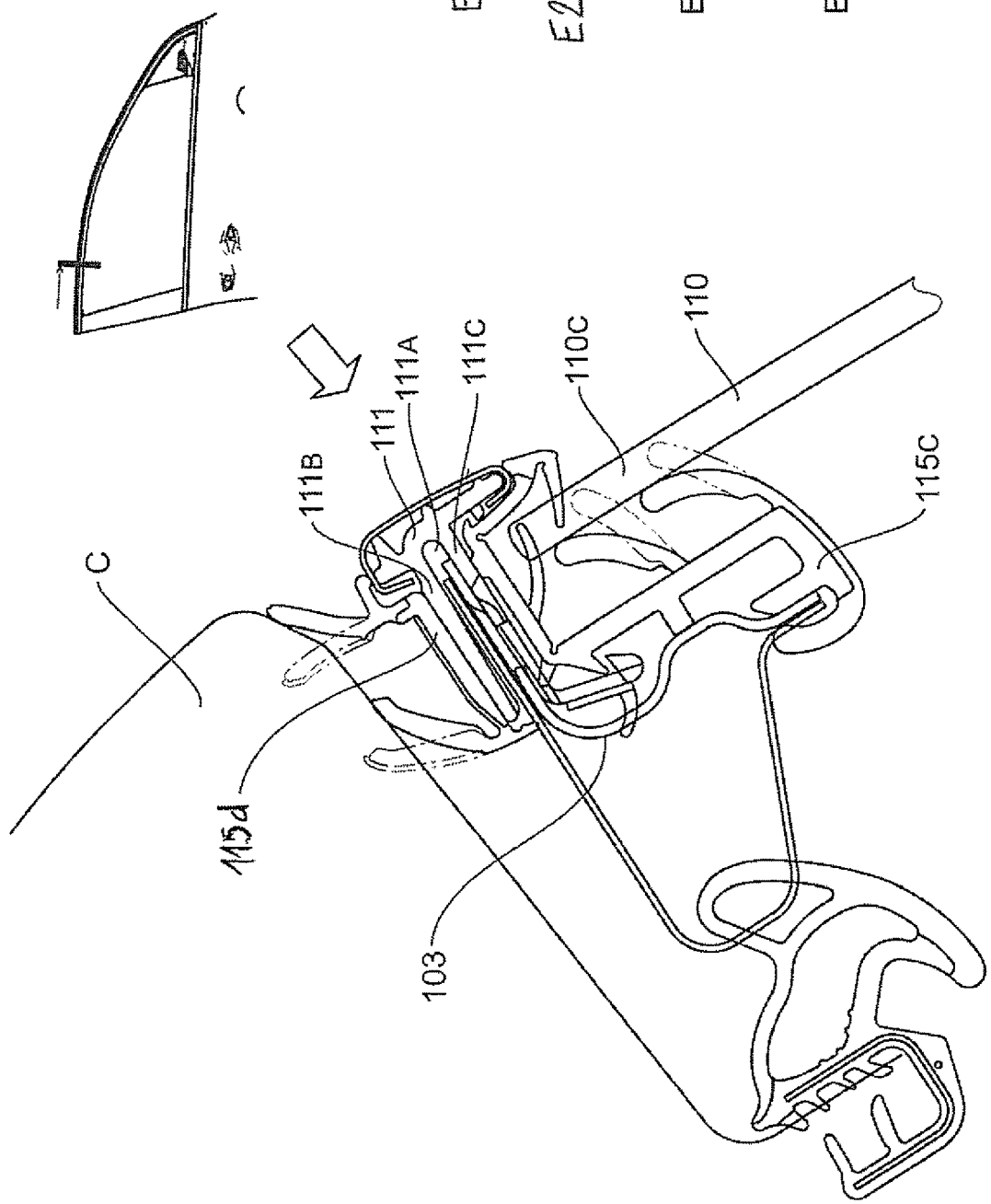
FIG. 3 is a cross-section view of the upper portion of a vehicle door according to the invention.

It is noted that, in FIG. 3, the upper portion 115$_C$ of the glazing seal 115 has four sealing lips, in the example shown in FIG. 3, intended to come into contact with the upper edge 110$_C$ of the mobile glazed panel 110, which is closed.

Said upper portion 115$_C$ is secured by clipping (and optionally bonding), or any other securing technique (welding or overmolding especially) to the upper cross member 11 and the upper frame 103 of the casing 10.

The sealing lip(s) 115$d$ are secured to the upper cross member 11 by welding, overmolding or any other technique (clipping or bonding especially).

It is also noted that, in FIG. 3, the upper cross member 111 has a U-shaped interior groove 111$_A$, arranged between the upper surface 111B and the lower surface 111$_C$, in which an edge of the upper frame 103 of the casing 10 is housed during assembly of the glazed portion 11 on the casing 10.

It is finally noted that the upper portion 115$_C$ of the glazing seal 115 includes a U-shaped end that overlaps with another edge of the upper frame 103.

The mobile glazed panel 110 is moved by driving means (not shown), for example a rack mechanism, itself actuated by an electric motor. Other driving means, including manual driving means, may of course be implemented.

Guide glides are attached on the face of the mobile glazed panel 110 oriented toward the interior of the vehicle. Said guide glides are intended to cooperate with rails 112$_A$, 112$_B$ and guide the rear 110$_A$ and front 110$_B$ edges of the mobile glazed panel 110 in the rails 112$_A$, 112$_B$. In practice, said glides are not generally visible from the outside (the corresponding area being screen-printed). In this embodiment, two glides 116 and 117 are intended to cooperate with the rail 112$_A$ oriented toward the rear, and a single glide 118 is intended to cooperate with the rail 112$_B$ oriented toward the front.

The guide rails 112$_A$, 112$_B$ ensure the dual function of guiding in translation and tacking. Said tacking, which is not imperative in all embodiments, makes it possible to slightly offset the mobile glazed panel 110 toward the outside, before it is moved in translation, so as to release it from the glazing seal 115, in order to facilitate the movement and limit the deterioration of the latter.

Figure 4:
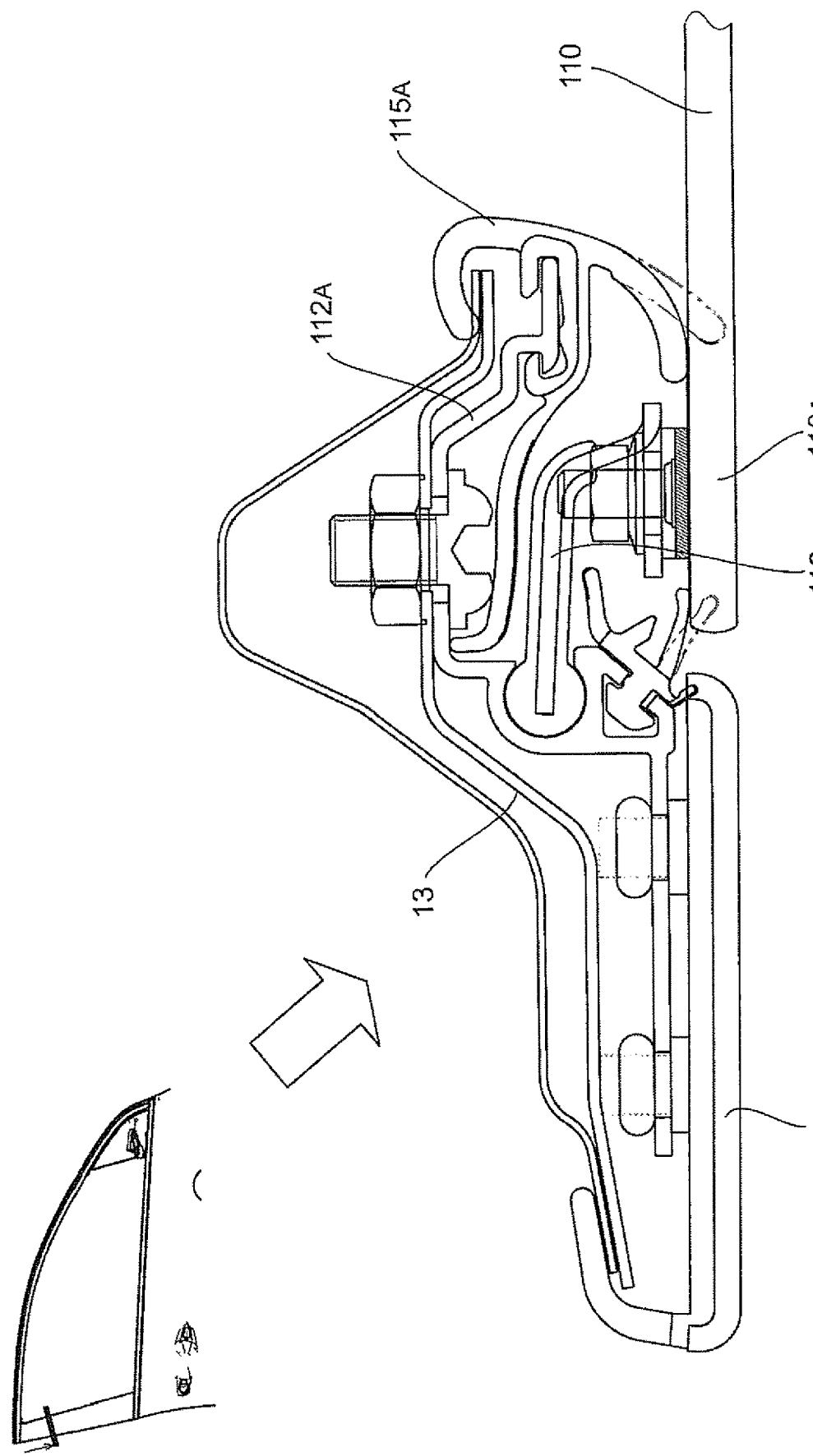
FIG. 4 is a cross-section view of the rear side portion of a vehicle door according to the invention.

It is noted that, in FIG. 4, the glide 116 attached to the mobile glazed panel 110 is arranged in the rail 112$_A$ and the branch 115$_A$ of the glazing seal 115 is clipped to the edge of the rail 112$_A$ oriented toward the mobile glazed panel 110.

The branch 115$_A$ of the glazing seal 115 has a first lip coming into contact with the rear edge 110$_A$ of the mobile glazed panel 110, which is closed, and a second lip covering the frame of the casing 10.

It is understood that, similarly, the branch 115$_B$ of the glazing seal 115 located on the rail 112$_B$, has a lip coming into contact with the front edge 110$_B$ of the mobile glazed panel 110.

The frame of the glazed portion 11 also has:
a central cross member 113 connecting the guide rails 112$_A$, 112$_B$ and which is screwed, for example, to the top of the lower portion 101 of the casing 10, and
two seals, namely an interior tongue 119 (attached to the central cross member 113) and an exterior tongue 120 (attached to the frame), which are intended to come into contact with the interior and exterior surfaces, respectively, of the mobile glazed panel 110, and which are intended to prevent water or other elements from entering the thickness of the casing 10.

The frame of the glazed portion 11 also has, in this example, a cap element 121 extending in the plane of the mobile glazed panel 110 when it is in the closed position, and an exterior rearview mirror base 122.

The door may have a shade.

The glazed assembly may also include one or more fixed glazed panel(s) or quarter panel(s).

In a specific embodiment, the mobile glazed panel has, on its face oriented toward the interior of the vehicle, two guide glides each slidably mounted with respect to a guide rail.

In another particular embodiment, the mobile glazed panel has a single guide glide cooperating with one of the two guide rails in which the mobile glazed panel slides.

FIG. 5 schematically shows the steps of an embodiment of the method for producing a motor vehicle door according to the invention.

In this example, the method includes the following steps:
production (step E1) of a door casing 10;
production (step E2) of a glazed device 11 including at least one mobile glazed panel 110 and guide rails 112$_A$, 112$_B$ by sliding said mobile glazed panel (110) between a closed position and at least one open position, said mobile glazed panel 110 having, on its face oriented toward the interior of the vehicle, at least one guide glide 116, 117, 118 slidably mounted with respect to one of said guide rails 112$_A$, 112$_B$, said guide rails 112$_A$, 112$_B$ being connected in their upper portion by an upper cross member 111,
assembly (step E3) of said door casing 10 and said glazed device 11.

It is noted that the step (E2) of producing the glazed device 11 includes a step of manufacturing (E20) in a single piece sealing lips 115$d$ and glazing seals 115, a step of placing (E21) sealing lips 115$d$ on the upper cross member 111 intended to come into contact with the vehicle body when the door 1 is closed, and a step of placing (E22), on the upper cross member 111 and guide rails 112$_A$, 112$_B$, glazing seals 115 intended to come into contact with the mobile glazed panel 110.

Thus, prior to the placement of the sealing lips 115$d$ and the glazing seals 115, the latter are produced in a single piece that is positioned on the upper cross member 111 and the guide rails 112$_A$, 112$_B$.

Numerous additions or alternatives to the embodiment described above may of course be envisaged.

The invention claimed is:

1. Glazed device (11) intended to be assembled with a door casing (10) for forming a motor vehicle door (1), including at least one mobile glazed panel (110) and guide rails (112A, 112B) by sliding said mobile glazed panel (110) between a closed position and at least one open position, said mobile glazed panel (110) having, on its face oriented toward the interior of the vehicle, at least one guide glide (116, 117, 118) slidably mounted with respect to one of said guide rails (112A, 112B), said guide rails (112A, 112B) being connected in their upper portion by an upper cross member (111), said upper cross member (111) having first sealing means (115$d$) intended to come into contact with the vehicle body when the door (1) is closed, and in that said upper cross member (111) and said guide rails (112A, 112B) having second sealing means (115) intended to come into contact with the mobile glazed panel (110), said first sealing means (115$d$) and said second sealing means (115) are produced in a single piece, characterized in that the first sealing means (115d) and the second sealing means (115) are welded on said upper cross member (111).

2. Glazed device (11) according to claim 1, characterized in that the second sealing means (115) are in the form of a continuous seal.

3. Glazed device (11) according to claim 1, characterized in that the first sealing means (115d) are arranged on the upper face (111B) of said upper cross member (111) and in that the second sealing means (115) are arranged on the lower face (111C) of said upper cross member (111).

4. Glazed device (11) according to claim 1, characterized in that said upper cross member (111) includes a slot (111A) in which an edge of the vehicle body casing is intended to be housed.

5. Glazed device (11) according to claim 2, characterized in that said slot (111A) is located between the upper face (111B) and the lower face (111C) of said upper cross member (111).

6. Glazed device (11) according to claim 1, characterized in that it includes a lower cross member (113) connecting the two guide rails (112A, 112B) in their lower portion and intended to be attached to the vehicle body casing.

7. Motor vehicle door (1), characterized in that it includes a glazed device (11) according to claim 1.

8. Motor vehicle, characterized in that it includes at least one glazed device (11) according to claim 1.

9. Method for producing a motor vehicle door (1), characterized in that it includes the following steps:
production (E1) of a door casing (10);
production (E2) of a glazed device (11) including at least one mobile glazed panel (110) and guide rails (112A, 112B) by sliding said mobile glazed panel (110) between a closed position and at least one open position, said mobile glazed panel (110) having, on its face oriented toward the interior of the vehicle, at least one guide glide (116, 117, 118) slidably mounted with respect to one of said guide rails (112A, 112B), said guide rails (112A, 112B) being connected in their upper portion by an upper cross member (111),
assembly (E3) of said door casing (10) and said glazed device (11),
said method being characterized in that the step (E2) of producing the glazed device (11) includes a step (E20) of manufacturing first sealing means (115d) and second sealing means (115) in a single piece and a step (E21) of placing first sealing means (115d) on said upper cross member (111) intended to come into contact with the vehicle body when the door (1) is closed, and a step (E22) of placing on said upper cross member (11) and said guide rails (112A, 112B), second sealing means (115) intended to come into contact with the mobile glazed panel (110) the first sealing means (115d) and the second sealing means (115) being welded on said upper cross member (111).

10. A sealing-tight device for a glazed device (11) intended to be assembled with a door casing (10) for forming a motor vehicle door (1), said glazed device (11) including at least one mobile glazed panel (110) and guide rails (112A, 112B) by sliding said mobile glazed panel (110) between a closed position and at least one open position, said mobile glazed panel (110) having, on its face oriented toward the interior of the vehicle, at least one guide glide (116, 117, 118) slidably mounted with respect to one of said guide rails (112A, 112B), said guide rails (112A, 112B) being connected in their upper portion by an upper cross member (111),
said sealing-tight device comprising:
first sealing means (115d) intended to be carried by said upper cross member (111) and intended to come into contact with the vehicle body when the door (1) is closed, and
second sealing means (115) intended to be carried by said upper cross member (111) and said guide rails (112A, 112B) and intended to come into contact with the mobile glazed panel (110), the first sealing means (115d) and the second sealing means (115) being produced in a single piece,
characterized in that the first sealing means (115d) and the second sealing means (115) are intended to be welded on said upper cross member (111).

* * * * *